(12) United States Patent
Tung et al.

(10) Patent No.: US 9,026,984 B2
(45) Date of Patent: *May 5, 2015

(54) INTEGRATED DESIGN APPLICATION SYSTEM

(75) Inventors: Teresa Tung, San Jose, CA (US); Dana Le, San Francisco, CA (US); Kunal Verma, Santa Clara, CA (US)

(73) Assignee: Accenture Global Services Limited, Dublin (IE)

( * ) Notice: Subject to any disclaimer, the term of this patent is extended or adjusted under 35 U.S.C. 154(b) by 129 days.

This patent is subject to a terminal disclaimer.

(21) Appl. No.: 13/616,658

(22) Filed: Sep. 14, 2012

(65) Prior Publication Data
US 2013/0014078 A1    Jan. 10, 2013

Related U.S. Application Data

(62) Division of application No. 12/247,927, filed on Oct. 8, 2008, now Pat. No. 8,572,548.

(51) Int. Cl.
*G06F 9/44* (2006.01)
*G06Q 10/06* (2012.01)

(52) U.S. Cl.
CPC ................................... *G06Q 10/06* (2013.01)

(58) Field of Classification Search
CPC ........... G06Q 10/06; G06Q 10/10; G06F 8/30
USPC ................................................ 717/100–119
See application file for complete search history.

(56) References Cited

U.S. PATENT DOCUMENTS

| | | | |
|---|---|---|---|
| 7,139,999 B2 * | 11/2006 | Bowman-Amuah | 717/101 |
| 7,475,130 B2 | 1/2009 | Silverman | |
| 7,757,126 B2 * | 7/2010 | Vidiyala | 714/38.14 |
| 8,069,437 B2 * | 11/2011 | Aigner et al. | 717/109 |
| 8,572,548 B2 * | 10/2013 | Tung et al. | 717/101 |
| 2001/0052108 A1 | 12/2001 | Bowman-Amuah | |
| 2004/0187140 A1 * | 9/2004 | Aigner et al. | 719/328 |

FOREIGN PATENT DOCUMENTS

| | | |
|---|---|---|
| CN | 101017513 | 8/2007 |
| JP | 2004507838 | 3/2004 |
| JP | 2007172223 | 7/2007 |

OTHER PUBLICATIONS

Hofmeister et al., "Designing a Platform-Independent Use-Case for a Composite Application using a Reference Architecture", 2007, Proceedings of the Nineteenth International Conference on Software Engineering & Knowledge Engineering (SEKE'2007), Boston, Massachusetts, pp. 227-231.*

Scheuermann et al., "XtreemOS—Integrated Project", Jan. 2007, retrieved from http://www.xtreemos.eu/project/publications//project-deliverables/d4-2-1_main.pdf, pp. 1-121.*

Extended European Search Report in Application No. 09252371.1, dated Jan. 5, 2015, 4 pages.

* cited by examiner

*Primary Examiner* — Ted T Vo
(74) *Attorney, Agent, or Firm* — Fish & Richardson P.C.

(57) ABSTRACT

Embodiments of the claimed subject matter provide a process and system for designing composite application systems. One embodiment of the claimed subject matter is a process of designing a composite application system to meet an application requirement. The process includes defining a use case scenario performed by a composite application system to meet the application requirement, integrating the use case scenario with an execution tool, and specifying an underlying infrastructure for the system design, wherein, the entire process is performed within an integrated software application.

20 Claims, 15 Drawing Sheets

FIG. 13

INTEGRATED DESIGN APPLICATION SYSTEM

CLAIM OF PRIORITY

This divisional application claims benefit and priority to U.S. Utility patent application Ser. No. 12/247,927, entitled "Integrated Design Application," filed Oct. 8, 2008 to Tung et al., which is incorporated herein by reference in its entirety.

BACKGROUND

The increasing popularity of businesses offering digital communication services (e.g. web services) have led to the development of robust, sophisticated systems capable of providing functionality for a diverse host of transactions. These systems are often conceived across one or more layers, typically including some combination of logical, hardware and process layers. Furthermore, these systems are frequently implemented as a composite of computerized hardware devices distributed across great distances—both logically and physically—all working in concert. Accordingly, the difficulty in designing these multi-layered, distributed systems to accurately and consistently achieve business objectives has grown to reflect the intricacy of meeting expanding demands while managing costs attributed to advancing system components.

The field of technology architecture has developed in response to address this need. A principle challenge in this particular field of architecture is to accurately capture a given set of objectives with one or more suitable business processes, and to implement the processes with the underlying physical infrastructure necessary to execute them successfully and efficiently. In large and complex systems, a single system design may include views of each layer of the system, e.g., the arrangement of system components, the processes performed by the system in its execution, and the actual system components used. These systems are also referred to as "composite application systems."

As mentioned, a composite application system may be designed for one or more purposes and/or objectives. These purposes (and/or objectives) commonly include, for example, performing one or more actions, achieving one or more system goals, observing particular specifications, meeting certain application requirements, or some combination thereof. A design process typically includes ideating a solution for performing the one or more design purposes. An ideated solution represents an approach and/or design methodology to potentially achieve (or most reasonably approximate) the one or more purposes (and/or objectives) intended for the composite application system.

Naturally, the design process may involve the effort of multiple collaborators, each with their own areas of expertise. Unfortunately, misalignment between collaborators may occur, either due to conflicting interests, budget concerns or simple miscommunication. Misalignment between a business model and its underlying infrastructure in a design can lead to system inefficiency, sub-optimal performance, or worse, an abject failure to meet business goals. Valuable time may be spent debugging, communicating with other collaborators, and re-designing the system to correct misalignments. This in turn may lead to a lack of predictability in both cost and performance in the system designed. In addition, the economic loss due to inefficiency compounded over the life of the system, or due to restructuring and re-provisioning system components can be enormous.

Misalignment in business system designs may result in poorly provisioned (either over-provisioned or under-provisioned) resources. Over-provisioning occurs when a system is designed with components having greater resources than what is actually needed to achieve application requirements, often at a higher cost than other suitable components and resulting in a waste of financial resources. In design projects with strict or limited budgets, over-provisioning one component may lead to budgetary restraints that restrict provisioning in other areas of the system to cheaper, less effective components that fail to operate at the level required by the design (under provisioning). Both over provisioning as well as under provisioning may also arise due to miscommunication of business objectives or a misunderstanding of system components.

Further amplifying the difficulty present in the current practice of technology architecture is the lack of both direct tool support and a unified standard of design. A lack of a direct tool and unified standard set may lead to collaborative misalignment, which in turn may result in inconsistent design quality, incompatible design formats and conflicting representations between and among regions, firms, individuals, or even design projects. Within a typical design process, contributors to the design may utilize a host of existing applications and/or applications from various existing toolsets. Examples include applications specifically engineered for word processing, computer aided diagramming, email, spreadsheets, software configuration management and file transfer protocol.

An example of collaborative misalignment may include a representation of one component in a system design expressed by one collaborator as text in a document, whereas another collaborator may choose to represent another component as a diagram. Establishing a standard framework for every design project, and/or merging and conforming inconsistent representations may take up valuable time and coordinating effort. Furthermore, there is currently no well known or popular application that supports explicitly visualizing relationships across components and design views.

Furthermore, in systems with multiple collaborators where duplicates of the design are distributed among the collaborators, it may be difficult to identify the most current version of the system design. One or more of the collaborators may implement changes on locally stored copies, whereby subsequent manual merging of the modifications may be difficult and time-consuming, and automated merging of distributed, locally stored copies may risk losing some or all of the modifications.

Finally, a lack of standardized tool support also presents difficulties for efficiently reusing previous work products, since the lack of a unified standard often results in each system being conceived according to ad hoc, non-standard designs. While an experienced system designer may have a backlog of stored work that the designer may use as a template, the lack of a unified standard or tool may limit references to the designer's individual work. New and less experienced designers may lack access to such resources.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments are directed to an integrated design application. Specifically, a system for designing composite application systems. Embodiments address a visual tool for information technology architecture which provides users with multiple views of the processes included in the design, allows users to explicitly create and view relationships across these views, allows specifying projected volumetric load with a beginning and end date, specifying the timescale (daily, hourly, weekly, etc) of those loads, assigning corresponding target metrics to technical or logical processes, and drawing relationships with the infrastructure components whose estimated performance will correspond to the target metrics.

In one embodiment, a process is provided for designing a composite application system to meet one or more application requirements. According to the process, a composite application system is designed within a single software application. The composite application system is designed by defining one or more use case scenarios performed by an ideated composite application system to meet one or more application requirements. The application requirements are captured as a function of system load specified as volumetric information whose required output is specified as target metrics. Once the one or more use case scenarios are defined, the one or more use case scenarios are then integrated with one or more execution tools. An underlying infrastructure embodying the one or more execution tools are identified and selected to achieve system requirements.

BRIEF DESCRIPTION OF DRAWINGS

The accompanying drawings, which are incorporated in and form a part of this specification, illustrate embodiments of the invention and, together with the description, serve to explain the principles of the invention:

FIG. 13 depicts a graphical representation of an exemplary performance file corresponding to a selected object in an underlying infrastructure during a process of designing a composite application in an integrated design application system, in accordance with one embodiment.

DETAILED DESCRIPTION

Figure 1:
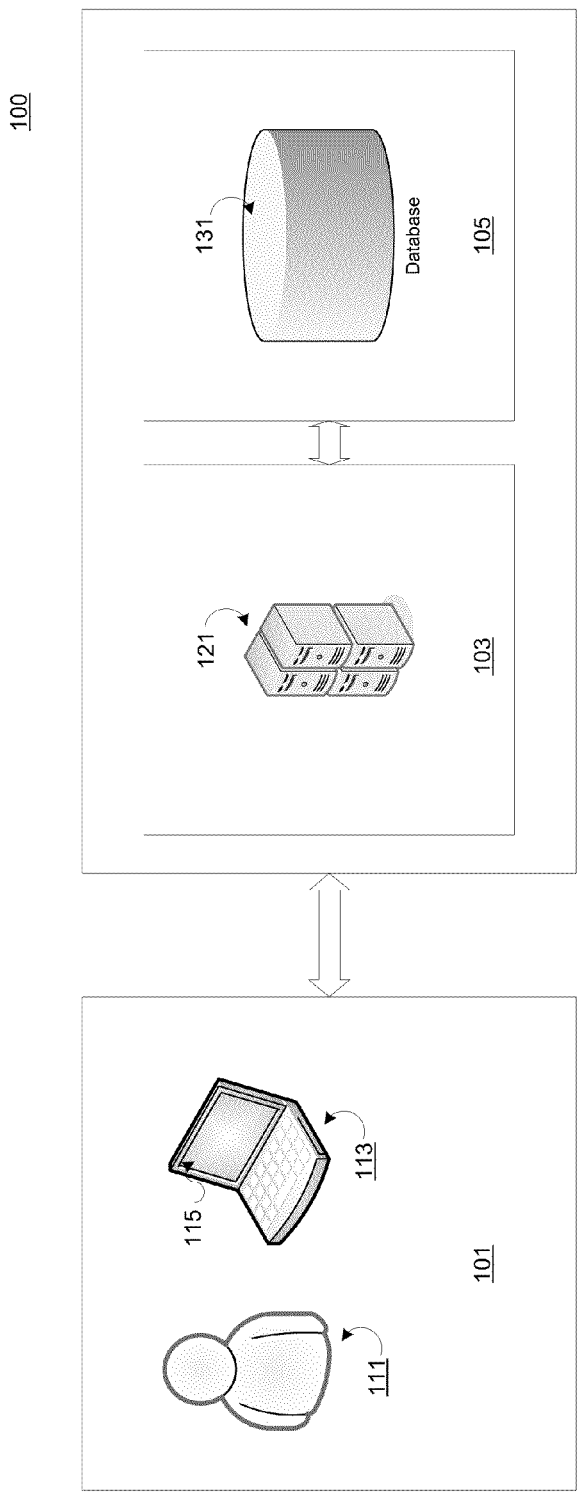
FIG. 1 depicts a component diagram of an integrated design application for designing composite application systems, in accordance with one embodiment.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 2) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following embodiments, an approach is described for providing an integrated design application for designing composite applications. Embodiments propose a method and system for designing composite applications that provides users with multiple views of the processes included in the design, allows users to explicitly create and view relationships across these views, allows assigning volumetric load information and target metrics to technical processes and to choose the infrastructure components whose performance match or approximate the target metrics for a specified load.

Integrated Design Application

With reference now to FIG. 1 a component diagram of an integrated design application 100 for designing composite application systems is depicted, in accordance with one embodiment. In a typical configuration, integrated design application 100 includes a client application 101, a business logic component 103 and a backend storage component 105.

According to one embodiment, a user 111 of the integrated design application 100 accesses the functionality of the integrated design application 100 via client device 113. Client device 113 may be the environment upon which interface 115 of the integrated design application 100 is implemented and accessed by the user 111. In some embodiments, a plurality of distributed users may utilize a plurality of client devices to access functionality of integrated design application 100 through a plurality of locally installed copies of interface 115.

In one embodiment, interface 115 of integrated design application 100 allows user 111 to manipulate (e.g., create, capture, provision, account for, etc. . . . ) composite application system designs. Interface 115 may, for example, allow user 111 to design a composite application system by provisioning a plurality of components having various attributes performing one or more case scenarios, to represent relationships among the components, and to simulate the performance of the designed system and specific components according to various metrics. Interface 115 may also be implemented to allow user 111 to view and make modifications to the design (i.e., by provisioning one or more substitute components) to more precisely align with system requirements or objectives.

Interface 115 may also capture (i.e., comprehensively represent) a composite application system design across a plurality of "layers." For example, a design, or portions of a design, may be represented across a process layer (e.g., the functions performed by the system), a logic layer (e.g., the information and/or technology tools required to perform the functions) and a physical layer (e.g., the actual, specifically identified devices selected to be used as the tools to perform the functions). In alternative embodiments, the number of layers comprising a composite application system design is not limited to the three specifically enumerated layers provided above (e.g., other layers may include a virtualization layer to show virtualized infrastructure and an application layer to show interactions of the software applications involved). According to such embodiments, a user 111 may allocate and specify any number of layers to represent the design.

Whereas conventional techniques for designing a composite application system may include designing the system over a plurality of design layers by using one or more independent, distinct platforms and design applications to represent each layer separately, integrated design application 100 allows a user 111 to view each layer in the design both individually and as the combination of the plurality of layers within a single application and interface 115. Furthermore, each of the plurality of layers comprising a composite application system design in the integrated design application 100 is capable of user-defined interrelation, thus cross referencing of the components (e.g., tools, relationships and case scenarios) is possible through the integrated design application 100. Accordingly, the aggregate effect on the system for each component may be visually represented to the user 111 through the interface 115 of the integrated design application 100.

Interface 115 may also include functionality to correlate material from disparate contributors to a project, to leverage past work as templates, to assign and display metric data, or to package and transfer designs (or files comprising specific portions of a design) to recipients. Correlating material from disparate contributors to a project may include, for example, merging functionality between nonconforming versions of the same file or file(s). Conflicting items discovered during the merging process may be displayed to the merging user via interface 115. Within these embodiments, the user may be able to dictate the result of merging two conflicting versions of the same item.

Interface 115 may also correlate material from disparate contributors to a project by offering communication functionality, such as messaging. For example, a user 111 may be able to attach one or more notes (or other textual/graphical displays) to a file, or a specific object in a file. Additional correlative functionality includes allowing documentation features for collaborating users. In some embodiments, a user may also be able to export (i.e., duplicate and output) design documentation in word processor and other text inclusive file types (e.g., as documents), spreadsheets, or graphic diagramming applications. Interface 115 may leverage past work as templates by, for example, accessing and displaying stored existing architecture (e.g., designs or portions of designs) stored in local storage, or backend storage component 105.

Typically, the design is stored locally in the client application as one or more files, collectively referred to and/or distinguished as a project. For projects which include contributions from distributed collaborators, a user 111 is able to transfer the locally stored version of the design (or portions of the design) to other users. In some embodiments, the user is able to transfer the design to a central repository accessible to other collaborators. In other embodiments, client devices of collaborating users also operate as nodes in a peer-to-peer network. In such embodiments, the transfer of files may be performed directly between client devices, in lieu of transferring to a central repository. Interface 115 may allow the user 111 to initiate connection with other collaborators, and may allow user-selection of source and destination of files. Transfer of the design may be performed in whole—typically by packaging the files comprising the project—or in part (transferring one or more specific files).

In some embodiments, interface 115 is implemented to include embedded applications that provide the underlying functionality accessible to the user 111. Embedded applications may, for example, include a diagramming application interface, word processing application, spreadsheet application, local database for local work storage, and one or more viewing applications for graphically representing relationships between components in the system. In alternate embodiments, the diagramming application interface may itself include functionality similar to word processing applications and/or may include features that graphically represent relationships between components in the system.

According to some embodiments, a design for a composite application system may include certain parameters according to specified input load and output metrics related to the system. Typical load information is characterized by volumetric data. This volumetric data may include, for example, the number/size of user sessions, number/size of messages, frequency and duration by time (e.g., hour, day, year, etc.) of access. Typical output metrics relate to system performance, and/or cost. Typically, load metrics have direct and/or indirect correlation with output metrics. Loads and metrics may be pre-defined, or may be customizable by the user, according to various embodiments. Interface 115 may be utilized to enter metrics according to user specified data. In some embodiments, load data associated with use case or application components and/or metric data corresponding to specific identified physical components may be supplied from external sources (e.g., backend storage component 105). In alternate embodiments, load and metric data may be customized and stored locally, for example, via programming in an embedded spreadsheet application.

Business logic component 103 facilitates collaboration among one or more distributed users of integrated design application 100. Facilitating collaboration may include, for example, rationalizing versions of a composite system design locally stored in the client devices of a plurality of distributed users with a central ("master") version. Business logic component 103 may provide additional collaboration-centric services such as providing advanced design simulation, granting access to external data sources, and capturing volumetric load data, among others. Business logic component 103 may include, in one embodiment, one or more computing devices (e.g., servers 121) communicatively coupled to each other, one or more client devices, or a network accessible by one or more client devices.

In one embodiment, the transfer of files between distributed users of design projects in integrated design application 100 is performed through business logic component 103. A user seeking to transfer a project or a subset of files to another collaborator (or to update a central version) sends the project (or subset of files) to business logic component 103. Business logic component 103 may subsequently archive and version these projects. Subsequent authorized users may be granted access to one or more versions of the project (or subsets of files).

In further embodiments, business logic component 103 includes advanced version control features. For example, business logic component 103 may execute features such as automatic documentation, exclusive checkout, version merging, version snapshotting and version rollback. Automatic documentation updates the metadata corresponding to usage of the file (e.g., dates and times of creation, last modification, etc. . . . ) and includes automated updating of the content therein. Exclusive checkout restricts access to one or more versions of a design project. For example, where checkout is restricted to one collaborator, once one or more versions of the design project stored in the business logic component 103 are accessed by a user 111, no other user is able to access the one or more versions of the design project until the one or more versions of the design project are no longer being accessed (i.e., resubmitted).

In some embodiments, exclusive checkout may be restricted to the version (i.e., other users may access versions not currently being accessed). In alternate embodiments, the length of time a checkout maintains exclusivity is limited to a period of duration. The expiration of said period removes the restrictions on access to the files being checked out.

Version merging reconciles multiple changes made to different copies of the same file. These changes are merged, resulting in a single new file that contains both sets of changes. In some embodiments, an authorized user is able to utilize interface 115 to dictate the result of merging two conflicting versions of the same item or file. The merge may be executed within business logic component 103, prior to transmission to interface 115 of one or more users. The merging user may also update the version of the file stored in the central repository with the merged version in business logic component 103.

Version snapshotting preserves versions of files which have been updated or merged. According to one embodiment, files within the central repository which have been updated may have previous versions renamed, stored, and may remain accessible to collaborating users. Likewise, version rollback allows an authorized user with access to the project to return a current version of a file to a previous version. For example, the current (i.e., most recently updated) master version of a file may be reconverted to a previous version, which becomes the master version.

For each of the features described (i.e., automated system documentation, exclusive checkout, version merging, version snapshotting and version rollback), authorized users may include, for example, all collaborators in a project, or be limited to specific users within a project. In other embodiments, authorization may be granted for the contents of the project. In another embodiment, authorization may be specifically limited to one or more files. Exclusive checkout, version merging, version snapshotting and version rollback are all features well known in the art, with various known implementations. Accordingly, a detailed explanation of implementation shall be omitted herein.

Version control data may also be explicitly captured by business logic component 103. Version control data may include, for example, the number of collaborators on a project, the number of transactions (i.e., file transmissions)

occurring during the duration of a project design, the size of communication (e.g., messages), and chronological details (such as time of day, time of year) for transactions and/or communications performed during the project life. Some version control data may be obtained, for example, by monitoring the number of identities (e.g., IP addresses, or user accounts in a network) accessing the central versions of the files. Alternatively, some volumetric data may also be obtained by monitoring the number of modifications (e.g., updates) to central versions of the files.

In yet further embodiments, business logic component 103 may extend features such as predictive operations modeling, run-time optimizing, and real time automated provisioning.

Backend storage component 105 provides additional storage functionality. Backend storage component 105 may be implemented as a repository storing versioning for users of integrated design application 100. In some embodiments, backend storage component 105 includes a database 131 of component attributes. For example, database 131 may store a knowledge base of vendors and the products corresponding to each vendor, with known attributes such as cost and performance. Attributes may include vendor-provided information. In further embodiments, backend storage component 105 collects performance metrics in configured systems for leverage in predicting performance of future systems. Backend storage component 105 may also store existing architectures which may be referenced by users for use as templates.

By providing the ability to correlate material from multiple (remote) contributors, the integrated design application 100 provides the ability for multiple users 111 to collaborate on the same project. Moreover, collaboration is possible directly amongst contributors, and during the same stage or phase of the design. Whereas conventional techniques which incorporate collaboration may exclude simultaneous and concurrent modifications and/or require manual conversion between disparate contributors, the above described features provide additional functionality to facilitate a seamless collaboration and subsequent content conversion.

Composite Application System Design

Figure 2:
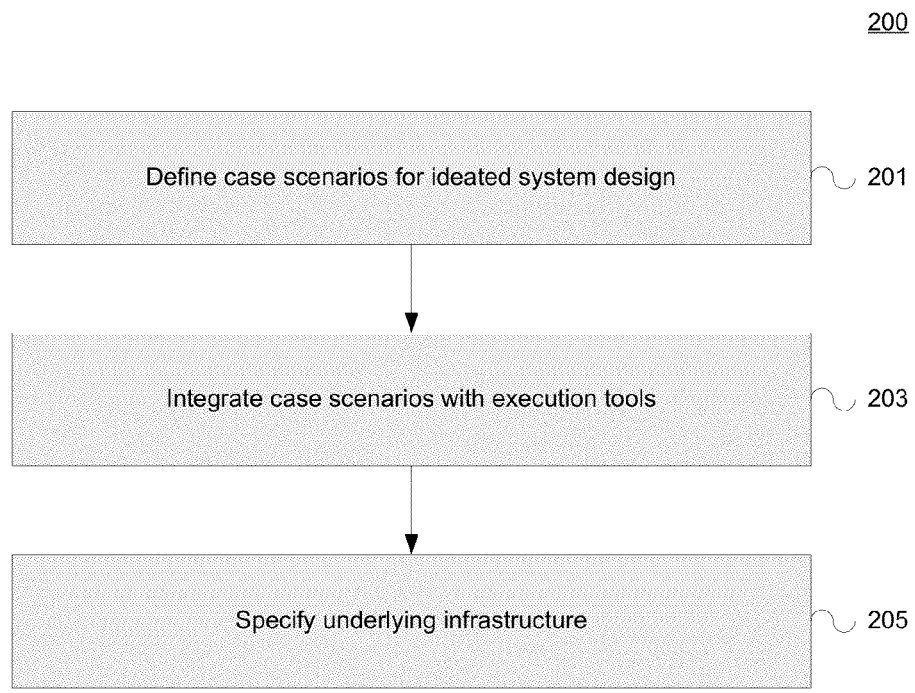
FIG. 2 depicts a flowchart of a process of designing a composite application system, in accordance with one embodiment.

FIG. 2 depicts a flowchart 200 of a process of designing a composite application system in an integrated design application, in accordance with one embodiment. Steps 201-205 describe exemplary steps comprising the process 200 in accordance with the various embodiments herein described.

At step 201, one or more use case scenarios of an ideated solution for an application system design are defined. A use case describes a sequence of behaviors in a system. Each use case describes how an actor (i.e., person or object supplying a stimulus to the system) interacts with the system to achieve a specific goal. One or more scenarios may be generated from each use case, with these scenarios corresponding to the available methods of achieving the goal.

Use case scenarios are often characterized as either a business use case or a system use case. A business use case generally describes a business process which provides value to a business actor, is typically described without high-level technical terminology, and describes what the process does. A system use case is normally described at the system functionality level and specifies the function or service the system provides for the user. A system use case will describe what the actor achieves through interaction with the system.

Defining use case scenarios for an ideated solution may include defining the scenarios that depict the functionality of the system with respect to the stages, programs, operations, processes and interactions reached or performed by the system to execute the functions. A use case may, for example, comprise the "steps" performed by a system to execute a specific operation, or to achieve an intended result. In addition, volumetric load and outcome target metrics may be associated with the use case.

At step 203, the one or more use case scenarios defined in step 201 are integrated with appropriate execution tools. Execution tools consist of the technology (e.g., components, devices) and applications (software) necessary to perform the use case scenarios. For example, a simple web-based business may include providing a service through one or more software platforms executing on one or more storage/processing components (e.g., servers) coupled to one or more communication technology components (e.g., routers).

At step 205, the underlying infrastructure comprising the composite application system is specified. Specifying the underlying infrastructure comprising the composite application system may include identifying the specific hardware and software components embodying the one or more execution tools. Specifying the underlying infrastructure typically also includes specifying the combination of hardware and software components that achieves system objectives optimally (i.e., with the greatest efficiency and/or efficacy). Specifying an underlying infrastructure may also include identifying the combination of hardware and software components which best approximates achievement of system objections, where actual achievement is impractical.

Whereas the system according to FIG. 2 has been designed according to three model layers, it is to be understood that a system design is not limited to the three exemplary model layers. Rather, the number of model layers may vary according to both usage and embodiments.

Specifying Underlying Infrastructure

Figure 3:
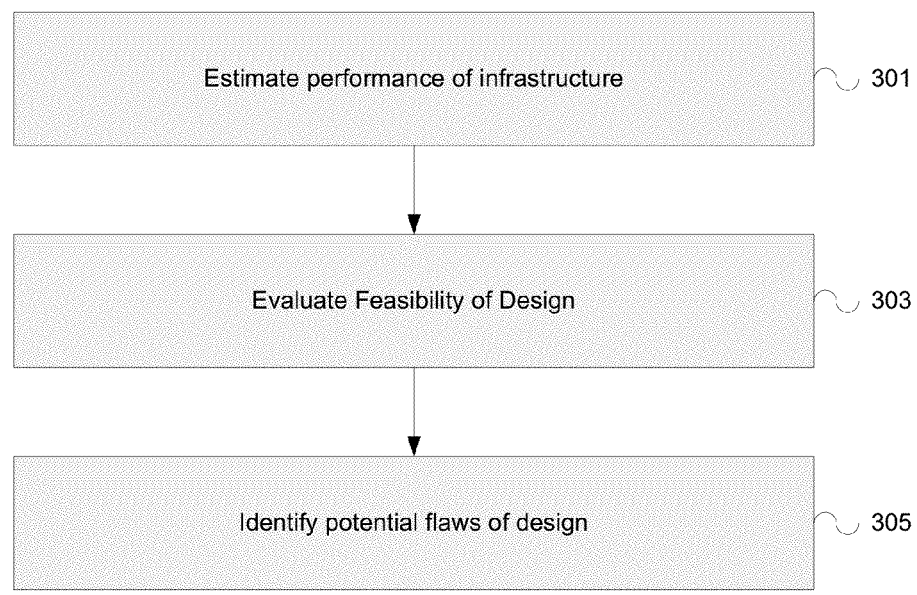
FIG. 3 depicts a flowchart of a process of specifying an underlying infrastructure for a system design, in accordance with one embodiment.

FIG. 3 depicts a flowchart 300 of a method of specifying an underlying infrastructure for a composite application system design as discussed in step 205, in accordance with one embodiment.

At step 301, the performance of the underlying infrastructure of the composite application system designed is estimated. According to one embodiment, estimating the performance of a system design may be performed by aggregating the user inputted estimated performance of each of the components in the component application system design. In some embodiments, the performance data of the components comprising the component application system design is pre-stored and accessible within the integrated design application.

At step 303, the feasibility of the design according to project objectives and/or goals is evaluated. Evaluation of the feasibility of the design comprises evaluating the estimated performance of the composite application system design obtained in step 301. Evaluation may comprise comparing the estimated performance of a composite application system according to the design with system performance requirements. In one embodiment, users may specify the thresholds and computations used to estimate feasibility of composite applications via an associated programmable platform (e.g., a spreadsheet). A successful comparison (i.e., wherein the estimated performance of the composite application system according to the design meets or exceeds system performance requirements) may be further evaluated to compare the estimated cost of the composite application system design with the system budget requirements.

A system design which meets both system budget and performance requirements is considered feasible. Alternatively, composite application system designs which fail either the performance evaluation or the cost evaluation by a relatively small margin may also be considered feasible. Composite application system designs which fail both performance and cost evaluations, or which fail either performance or cost evaluations by a proportionally large margin may be evaluated as unfeasible.

At step 305, potential flaws of feasible designs (according to the evaluation performed at step 303) are identified. Potential flaws may include the specific component or components which cause the system design to fail to meet system requirements. Potential flaws may also include a specific combination or arrangement of components which result in suboptimal output. Determination of the specific components which cause the system design to fail may be made by comparing the estimated performance and estimated cost of each component in the composite application system design with the expected performance and expected cost of a component that meets system requirements.

Basic Computing Device

Figure 4:
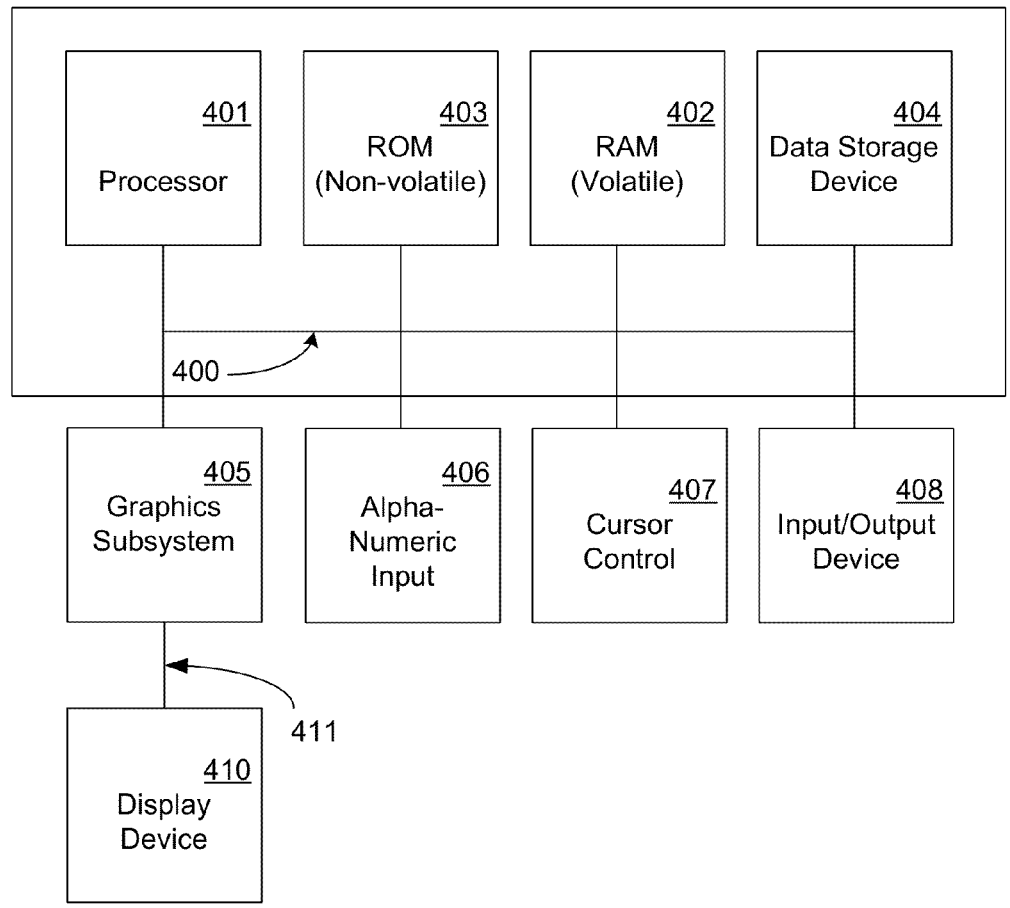
FIG. 4 is a block diagram of an exemplary computer system upon which embodiments of the present invention may be implemented, in accordance with one embodiment.

Referring now to FIG. 4, a block diagram of an exemplary computer system 412 is shown. It is appreciated that computer system 412 described herein illustrates an exemplary configuration of an operational platform upon which embodiments may be implemented to advantage. Nevertheless, other computer systems with differing configurations can also be used in place of computer system 412 within the scope of the present invention. That is, computer system 412 can include elements other than those described in conjunction with FIG. 4. Moreover, embodiments may be practiced on any system which can be configured to enable it, not just computer systems like computer system 412. It is understood that embodiments can be practiced on many different types of computer system 412. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

With reference to FIG. 4, an exemplary system for implementing embodiments includes a general purpose computing system environment, such as computing system 412. In its most basic configuration, computing system 412 typically includes at least one processing unit 401 and memory, and an address/data bus 400 (or other interface) for communicating information. Depending on the exact configuration and type of computing system environment, memory may be volatile (such as RAM 402), non-volatile (such as ROM 403, flash memory, etc.) or some combination of the two. Computer system 412 may also comprise an optional graphics subsystem 405 for presenting information to the computer user, e.g., by displaying information on an attached display device 410, connected by a video cable 411.

Additionally, computing system 412 may also have additional features/functionality. For example, computing system 412 may also include additional storage (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 412 also comprises an optional alphanumeric input device 406, an optional cursor control or directing device 407, and one or more signal communication interfaces (input/output devices, e.g., a network interface card) 408. The optional alphanumeric input device 406 can communicate information and command selections to central processor 404. The optional cursor control or directing device 407 is coupled to bus 400 for communicating user input information and command selections to central processor 404. The signal communication interface (input/output device) 408, which is also coupled to bus 400, can be a serial port. The communication interface 408 may also include wireless communication mechanisms. Using communication interface 408, computer system 412 can be communicatively coupled to other computer systems over a communication network such as the Internet or an intranet (e.g., a local area network), or can receive data (e.g., a digital television signal).

Defining Use Case Scenarios

Figure 5:
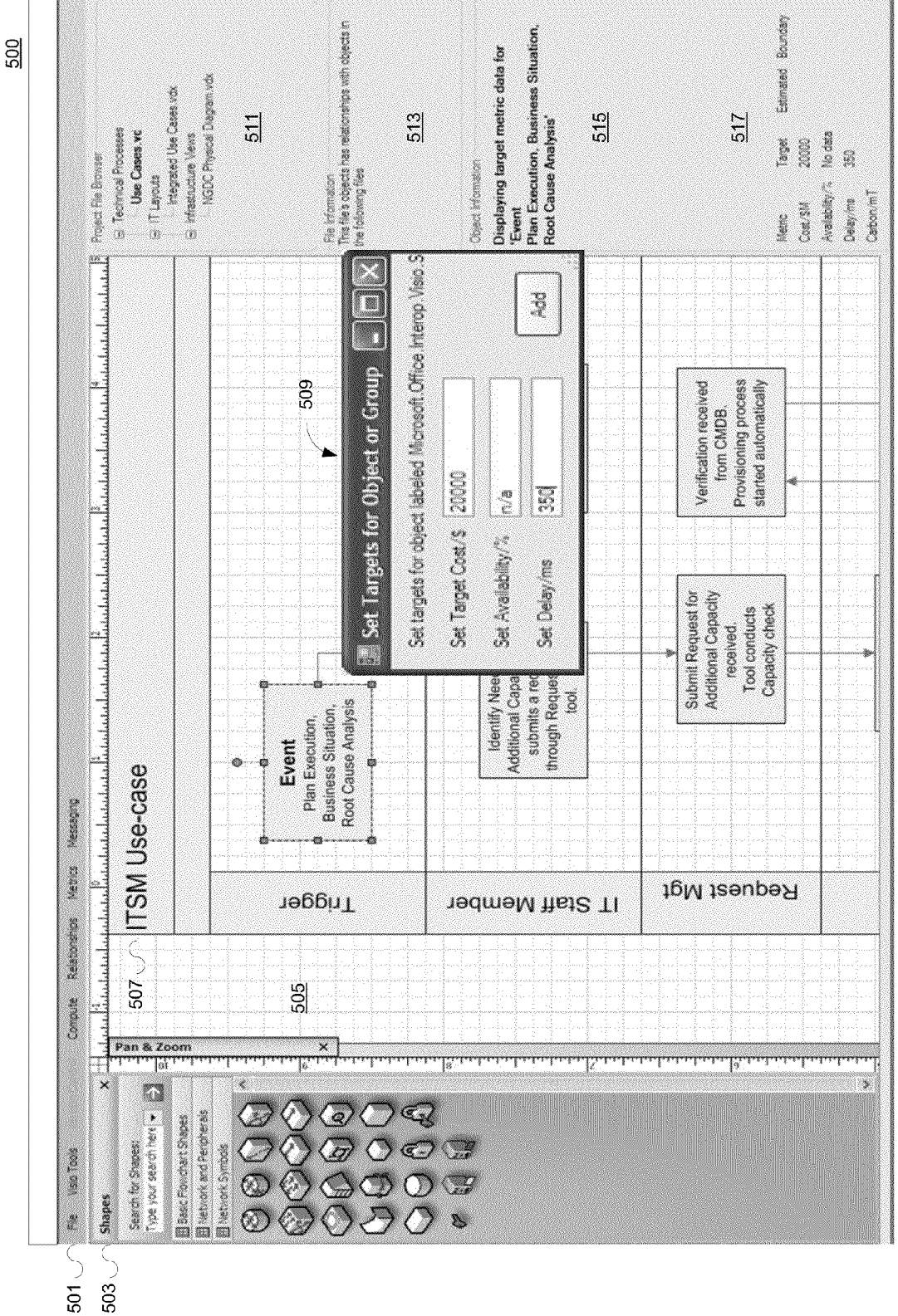
FIG. 5 depicts a graphical representation of an exemplary user interface for defining use case scenarios during a process of designing a composite application in an integrated design application system, in accordance with one embodiment.

FIG. 5 depicts a graphical representation of an exemplary user interface 500 for defining use case scenarios during a process of designing a composite application in an integrated design application system (step 201, FIG. 2), in accordance with one embodiment.

In the depicted embodiment, user interface 500 is an exemplary graphical representation of a user interface within integrated design application 100. Exemplary user interface 500 includes toolbar 501, panel 503, viewing window 505, exemplary design layout (e.g., layout window 507), File Browser 511, File Information Display 513, Object Information Display 515, Object Target Window 509 and Metric and Volumetric Display 517.

Toolbar 501 provides access to functions available to the user 111 of the integrated design application. Toolbar 501 typically is implemented to display keywords approximating a general characterization of the underlying functions. Often, one or more functions are further revealed to the user via a drop down bar or menu by clicking (e.g., selecting via an input device) the keyword. As shown, toolbar 501 includes functions related to: manipulating the file ("File"), diagramming tools ("Visio Tools"), calculation (e.g., "Compute"), relationship mapping ("Relationships"), target output metric and load volumetric data ("Performance") and communication ("Messaging"). Accordingly, other embodiments may include different functions, a different arrangement of the enumerated functions, or may include a subset of the one or more functions.

As presented, panel 503 displays a panel of operation-specific functions. For example, in the current depiction of FIG. 5, user interface 500 displays the process layer of an exemplary design. As such, panel 503 includes functions specific to the current operation (in the present case, defining use case scenarios). As shown, panel 503 includes "Shapes" comprising shaped objects representative of components which may be used in defining use case scenarios.

As shown, viewing window 505 displays the current file or content the user is viewing and/or manipulating. As depicted in FIG. 5, viewing window 505 includes a display of layout window 507, which displays the use case(s) comprising the exemplary project. In further embodiments, viewing window may include support for the content displayed. For example, during design or display operations, features that alter perspective (e.g., "Pan & Zoom") or simple tools that assist in measurement may be provided.

As depicted, layout window 507 depicts an exemplary use case scenario depicting the technical processes included in exemplary design. The objects comprising layout window 507 are exemplary and for display purposes only.

File Browser 511 ("Project File Browser") displays the files currently collected in the project. As depicted, File Browser 511 further distinguishes the files contained in the project according to layer. In other embodiments, File Browser 511 may automatically organize the files contained in File Browser 511 according to other arrangements. In further embodiments, File Browser 511 may display the files in an order specified by a collaborating user. Alternatively, the order of files displayed may be specific to the user, and/or adjustable for each version of the design.

In one embodiment, File Information Display 513 may display information corresponding to the currently viewed file(s). For example, File Information Display 513 may indicate the existence of relationships of objects within the currently viewed file(s). In other embodiments, File Information Display 513 may also provide alerts and/or notice that one or more objects in a file conflict with system objectives. In further embodiments, File Information Display 513 may display collaborator notes (e.g., messages to other collaborators).

As presented, Object Information Display 515 displays information corresponding to a selected object or process. The information displayed in Object Information Display 515 may, for example, include computational characteristics of the selected object, and/or metadata corresponding to estimated performance statistics. Computational characteristics may include computations for the data entered in Object Information Window 509 corresponding to the selected object or process. Metadata corresponding to estimated performance statistics may, for example, include the number of reporting data sources comprising the estimation. According to some embodiments, when no object or process is currently selected, Object Information Display 515 may display the information of the last selected object or process. In further embodiments, when no object or process is selected, Object Information Display 515 may be empty. In alternate embodiments, when no object or process is selected, Object Information Display 515 may display an indication that no object or process is selected.

As depicted, Object Target Window 509 displays information corresponding to a selected object or process in a use case, as referenced by Object Information Display 515. Information corresponding to a selected object or process in a use case may include target metrics (i.e., the conditions sufficient to achieve system objectives) for that object or process. In some embodiments, Object Target Window 509 allows a viewing user with authorization to enter target data for the selected object or process. For exemplary purposes, as presented, Object Target Window 509 allows a user to view and/or set a target cost, availability and delay for the selected object.

Metric and Volumetric Display 517 displays information corresponding to metrics established for a selected object or process. The information contained in Metric and Volumetric Display 517 may be used, for example, to view the performance of the system design relative to system objectives and/or targeted metrics (e.g., cost, performance, etc. . . . ). A user is thus able to view whether the metrics of the system design conform with the objectives or targeted metrics. Accordingly, nonconforming system designs may be modified (e.g., re-provisioning components of the underlying infrastructure) to more precisely align with the system. Information corresponding to metrics established for a selected object or process may include data fields such as designated metric goals, estimated performance of current design, absolute performance limits according to components comprising current design, etc. . . . . Information corresponding to metrics established for a selected object or process may be obtained from a pre-established storage of data and/or may be entered by a user via Object Information Window 509.

In further embodiments, metric and volumetric display 517 may provide the calculated estimates for metric data according to the current system design. Metric data may include, for example, cost, carbon, performance and availability metrics. Metric data may be obtained via referenced to a depository of metric data corresponding to the components comprising the current system design. Modifications to the current system design may thus result in a running recalculation and modified estimates for the metric data of the system design. Accordingly, metric data estimates may be available during the design process, and a completed system design would not be necessary to derive estimated metric data according to this embodiment. In still further embodiments, the metric and volumetric display 517 re-calculates composite metrics for the current system design across all application layers on demand.

By providing the ability to display calculated estimates for metric data, a user is able to immediately monitor the effect to the composite system design of each additional component or relationship added. Subsequently, system goals may be easier to track, and system feasibility may be determined earlier during the design process than according to conventional techniques. For example, over provisioning may be detected immediately if the combination of certain components has an estimated cost greater than according to the application or project requirements.

According to some embodiments, when no object or process is currently selected, Metric and Volumetric Display 517 may display the information of the last selected object or process. In further embodiments, when no object or process is selected, Object Information Display 515 may be empty. In alternate embodiments, when no object or process is selected, Object Information Display 515 may display an indication that no object or process has been selected. In yet further embodiments, Metric and Volumetric Display 517 may explicitly indicate that an object or process lacking sufficient volumetric load data and/or performance metric data to compute a particular data field has insufficient data.

Use Case and Execution Tool Integration

Figure 6:
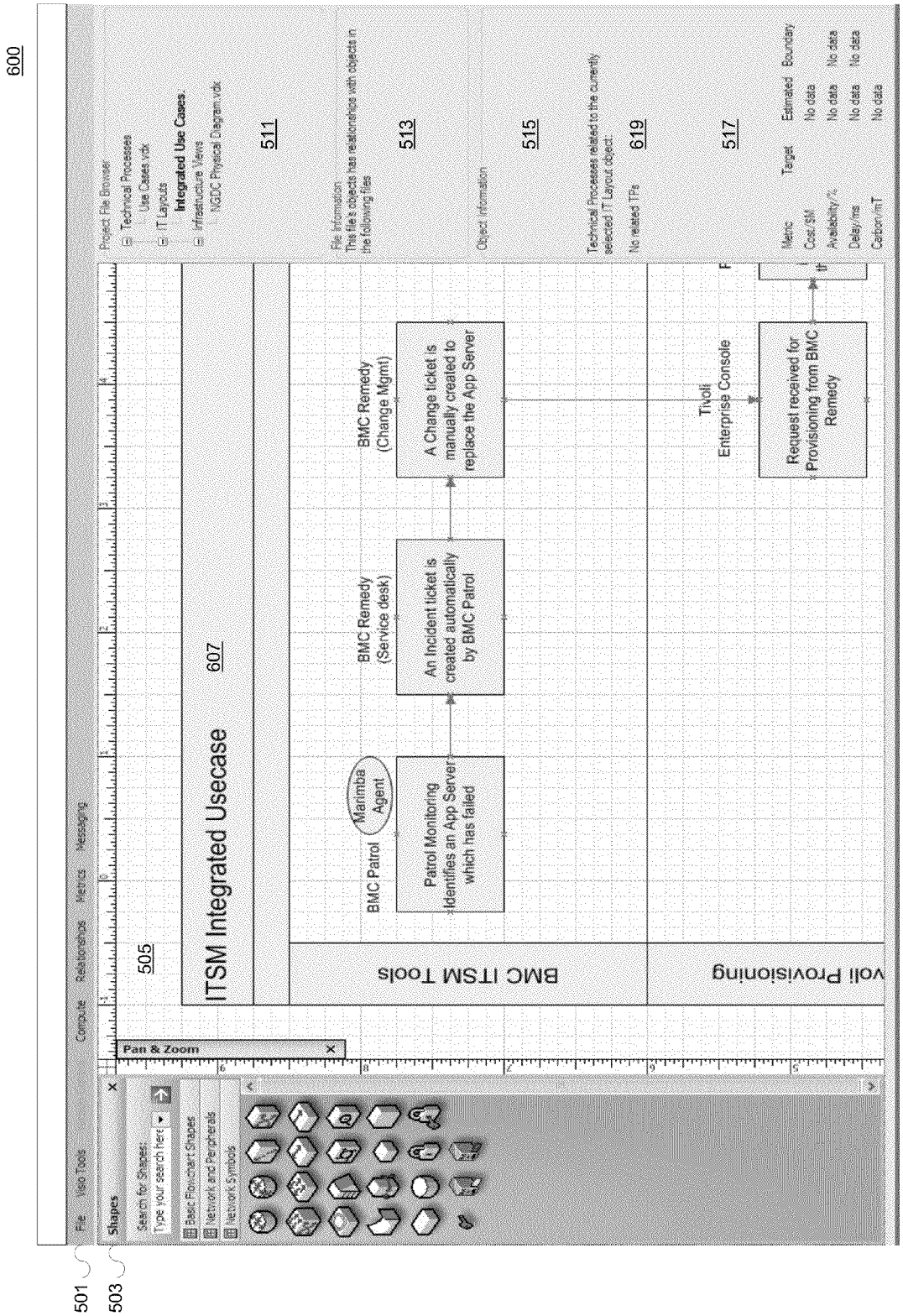
FIG. 6 depicts graphical representation of an exemplary user interface for integrating use cases with execution tools during a process of designing a composite application in an integrated design application system, in accordance with one embodiment.

FIG. 6 depicts a graphical representation of an exemplary user interface 600 for integrating use cases with execution tools during a process of designing a composite application in an integrated design application system (step 203, FIG. 2), in accordance with one embodiment.

In the depicted embodiment, exemplary user interface 600 is an exemplary graphical representation of a user interface within integrated design application 100. Exemplary user interface 600 includes toolbar 501, panel 503, viewing window 505, exemplary design layout (e.g., layout window 607), File Browser 511, File Information Display 513, Object Information Display 515, Object Information Window 509, Metric and Volumetric Display 517, and Related Technical Processes display 619.

Detailed descriptions for toolbar 501, panel 503, viewing window 505, File Browser 511, File Information Display 513, Object Information Display 515, Object Information Window 509, and Metric and Volumetric Display 517 have been provided have been provided in the foregoing embodiments. Accordingly, repetition shall be herein omitted.

As depicted, layout window 607 depicts an exemplary use case scenario having components which are integrated with execution tools in an exemplary composite application design. The objects comprising layout window 607 are exemplary and for display purposes only. As shown, layout window 607 includes execution tools which have been paired to specific technical processes in an exemplary use case scenario. For example, one technical process in the use case scenario is displayed as "Patrol Monitoring Identifies an App Server which has failed." Layout window 607 displays the execution tool (e.g., "Marimba Agent") which performs the action identified by the technical process.

As presented, Related Technical Processes display 619 displays the related technical processes for a selected object (e.g., execution tool, infrastructure device) in layout window 607. Related technical processes may include the technical processes mapped to the object. Technical processes may include the operations performed by the object to enable achievement of the specific use defined in the use case. Objects which have no related technical processes may have an empty Related Technical Processes display 619. In alternative embodiments, objects which have no related technical processes may have a Related Technical Processes display 619 explicitly indicating the absence of related technical processes.

Specifying Underlying Infrastructure

Figure 7:
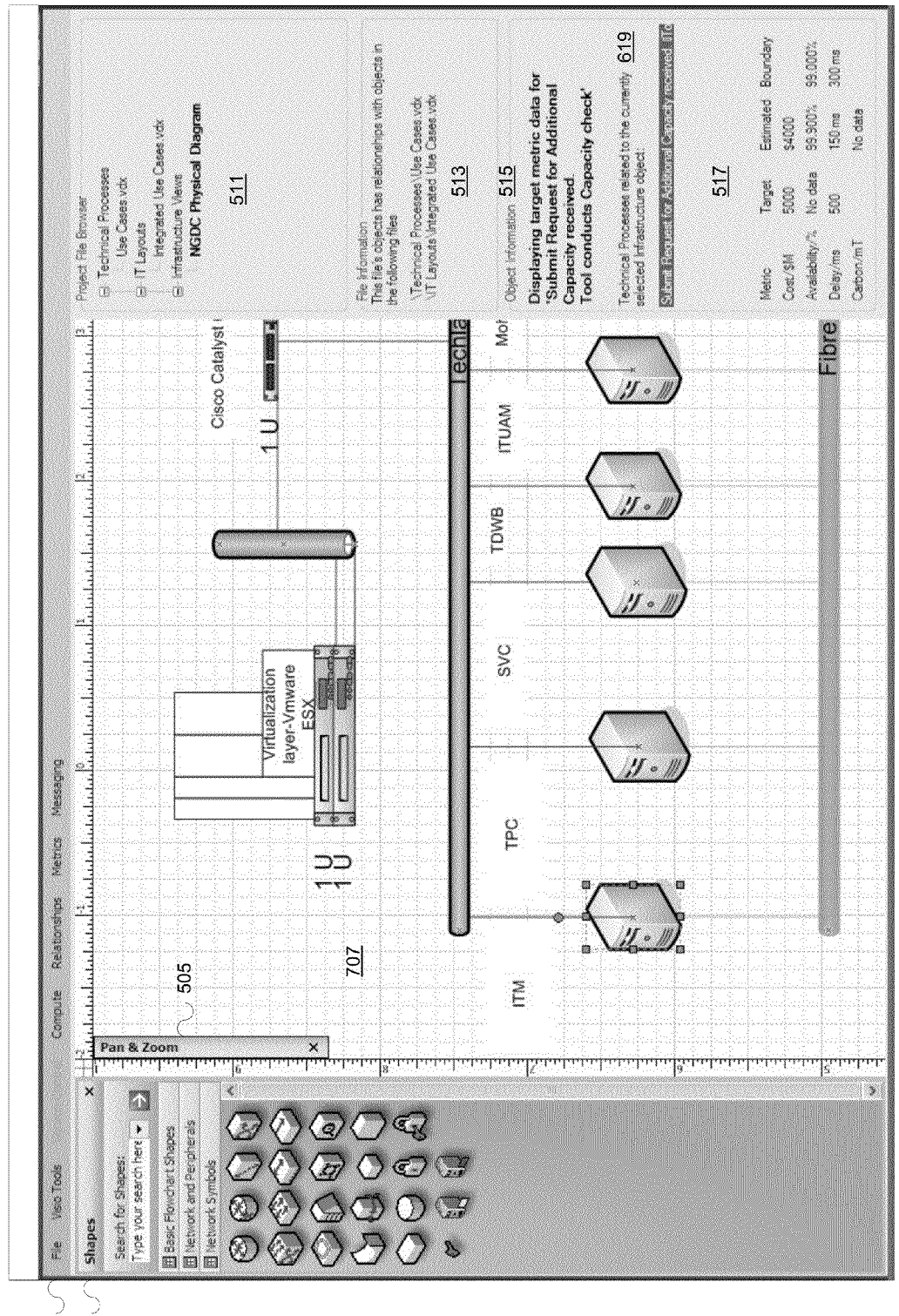
FIG. 7 depicts a graphical representation of an exemplary user interface for specifying an underlying infrastructure during a process of designing a composite application in an integrated design application system, in accordance with one embodiment.

FIG. 7 depicts a graphical representation of an exemplary user interface 700 for specifying an underlying infrastructure during a process of designing a composite application in an integrated design application system (step 205, FIG. 2), in accordance with one embodiment.

In the depicted embodiment, exemplary user interface 700 is an exemplary graphical representation of a user interface within integrated design application 100. Exemplary user interface 700 includes toolbar 501, panel 503, viewing window 505, exemplary design layout (e.g., layout window 707), File Browser 511, File Information Display 513, Object Information Display 515, Object Information Window 509, Metric and Volumetric Display 517, and Related Technical Processes display 619.

Detailed descriptions for toolbar 501, panel 503, viewing window 505, File Browser 511, File Information Display 513, Object Information Display 515, Object Information Window 509, Metric and Volumetric Display 517, and Related Technical Processes display 619 have been provided in the foregoing embodiments.

As depicted, layout window 707 depicts the components comprising an underlying infrastructure in an exemplary composite application design. The objects comprising layout window 807 are exemplary and for display purposes only. As shown, layout window 707 includes specifically identified hardware devices and software platforms which have been selected as the tools to execute the use cases of a use case scenario. For example, objects designated "virtualization layer-Vmware ESX" each reference a VMware ESX Server—an enterprise-level virtualization product offered by commercial vendor VMware, Inc.

Relationship Mapping Between Use Case Components and Execution Tools

Figure 8:
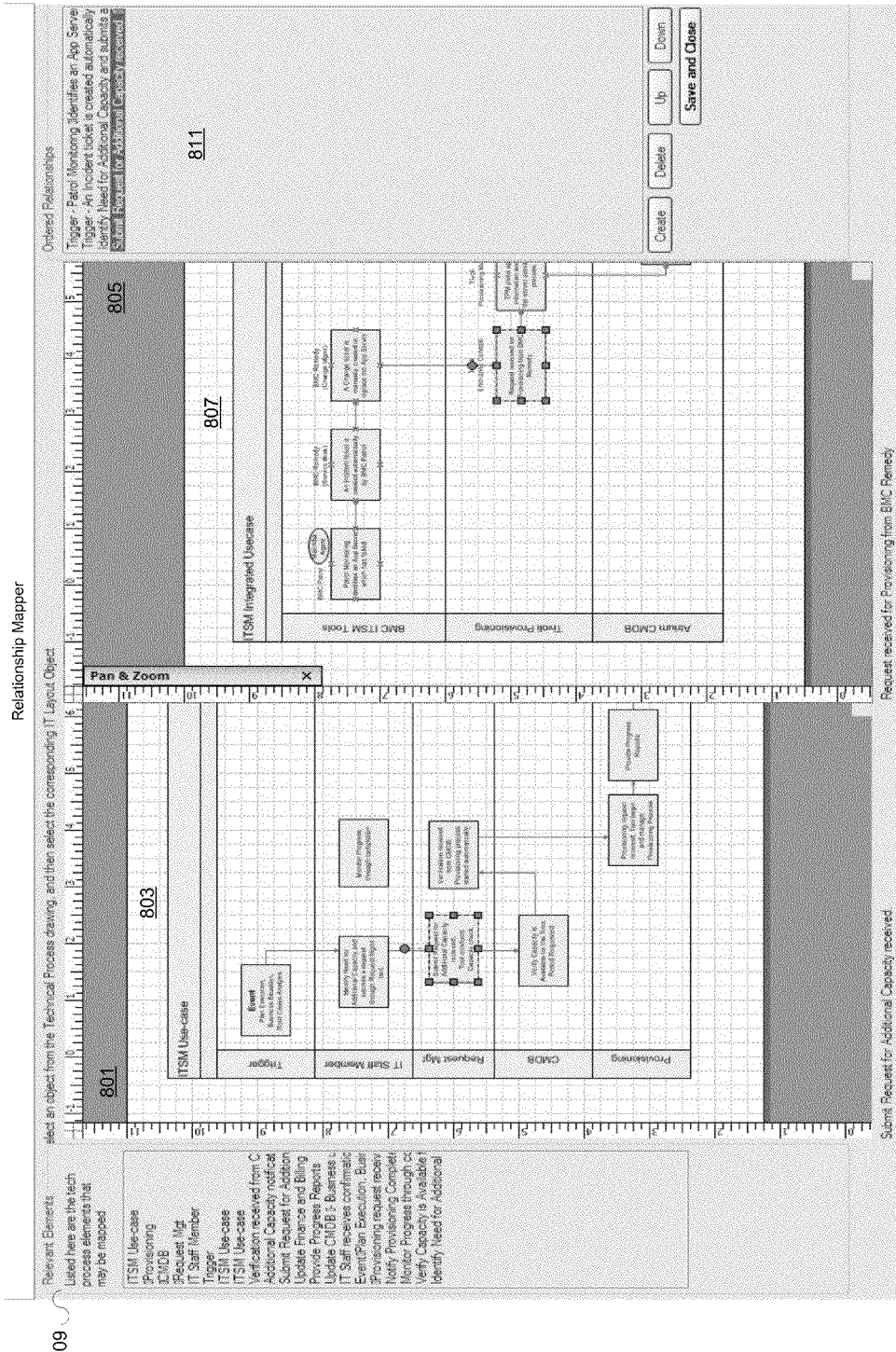
FIG. 8 depicts a graphical representation of a user interface for mapping relationships between technical processes in a use case scenario with execution tools during a process of designing a composite application in an integrated design application system, in accordance with one embodiment.

FIG. 8 depicts a graphical representation of a user interface 800 for mapping relationships between technical processes in a use case scenario with execution tools during a process of designing a composite application in an integrated design application system, in accordance with one embodiment.

In the depicted embodiment, user interface 800 is an exemplary graphical representation of a user interface within integrated design application 100. Exemplary user interface 800 includes one or more viewing surfaces (e.g., viewing windows 801, 805) and exemplary design layouts (e.g., layout windows 803, 807). Exemplary user interface 800 also includes Relevant Elements Display 809, and Ordered Relationships Display 811.

Viewing windows 801 and 805 display layout windows (e.g., layout windows 803 and 807) and allow a user to view and/or map relationships between components (e.g., technical processes and execution tools) comprising the layout windows. For example, layout window 803 displays the one or more technical processes comprising a use case scenario for an exemplary composite application design. Layout window 807 displays the use case scenario with execution tools. User interface 800 thus allows a user to integrate the technical processes of the use case scenario displayed in layout window 803 with the execution tools in layout window 807 by mapping a relationship between a technical process and its corresponding execution tool. Accordingly, once mapped, the relationship is explicitly observable through user interface 800.

Ordered Relationships Display 811 displays a list of the relationships between objects in layout windows 803 and 807 of user interface 800 which have been mapped. Ordered Relationships Display 811 may also allow a user to create (i.e., "map") and delete (i.e., "un-map") relationships between objects in the layout windows. In some embodiments, Ordered Relationships Display 811 may also allow a user to save modifications to existing mapped relationships. In some embodiments, Ordered Relationships Display 811 also allows a user to alter the presentation of the list of mapped relationships in Ordered Relationships Display 811.

According to further embodiments, when no relationships have been mapped, Ordered Relationships Display 711 may be empty. In alternate embodiments, when no relationships have been mapped, Ordered Relationships Display 811 may display an indication that relationships have been mapped.

Relationship Mapping Between Use Case Components and Underlying Infrastructure

Figure 9:
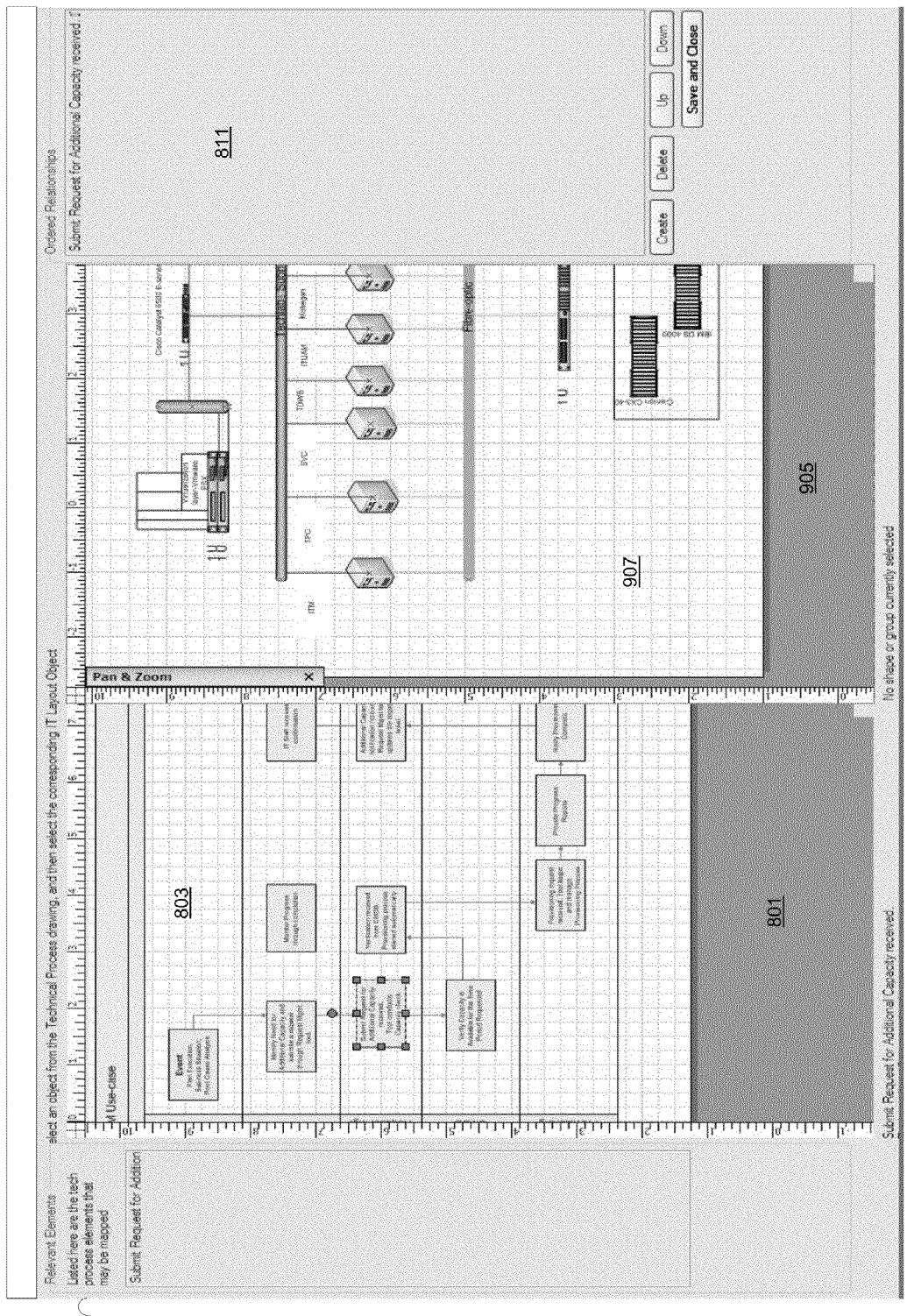
FIG. 9 depicts a graphical representation of a user interface for mapping relationships between components in a use case scenario with components of an underlying infrastructure during a process of designing a composite application in an integrated design application system, in accordance with one embodiment.

FIG. 9 depicts a graphical representation of a user interface 900 for mapping relationships between components in a use case scenario with components of an underlying infrastructure during a process of designing a composite application in an integrated design application system, in accordance with one embodiment.

In the depicted embodiment, user interface 900 is an exemplary graphical representation of a user interface within integrated design application 100. Exemplary user interface 900 includes one or more viewing surfaces (e.g., viewing windows 801, 905) and exemplary design layouts (e.g., layout windows 803, 907). Exemplary user interface 900 also includes Relevant Elements Display 809, and Ordered Relationships Display 811.

Viewing windows 801 and 905 display layout windows (e.g., layout windows 803 and 907) and allow a user to view and/or map relationships between components (e.g., technical processes and underlying infrastructure devices) comprising the layout windows. For example, layout window 803 displays the one or more technical processes comprising a use case scenario for an exemplary composite application design. Layout window 907 displays the underlying infrastructure of the same exemplary composite application design. User interface 900 thus allows a user to map a relationship between a technical process displayed in layout window 803 with a specific device comprising the infrastructure of the use case scenario displayed in layout window 907. Accordingly, once mapped, the relationship is explicitly observable through user interface 800.

Detailed descriptions for Relevant Elements Display 809 and Ordered Relationships Display 811 have been provided have been provided in the foregoing embodiments.

Defining Volumetric and Target Metric Data

Figures 10A, 10B:
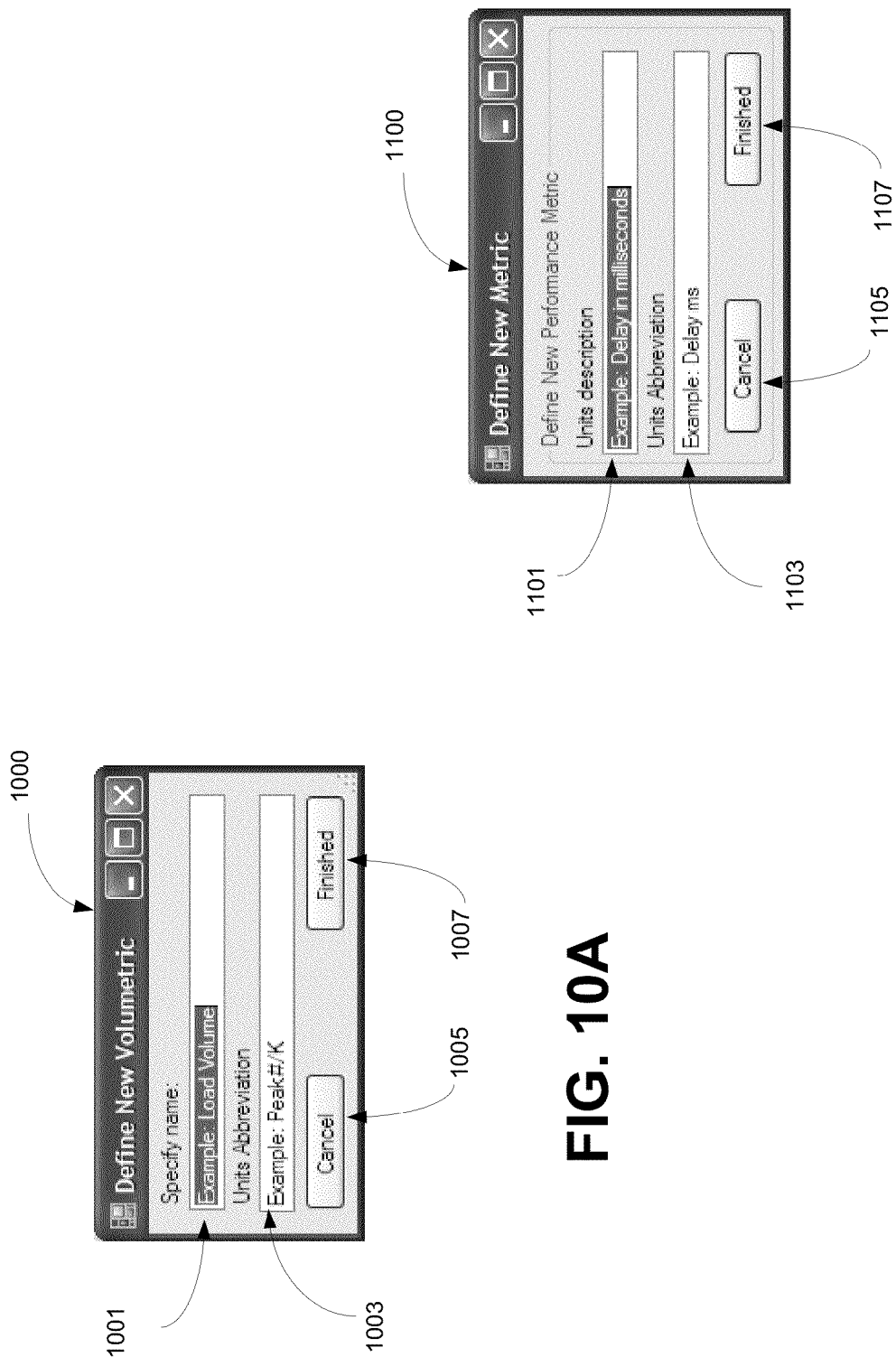
FIG. 10A depicts a graphical representation of a user interface for defining volumetric data of an underlying infrastructure during a process of designing a composite application in an integrated design application system, in accordance with one embodiment.
FIG. 10B depicts a graphical representation of a user interface for defining target metric data of an underlying infrastructure during a process of designing a composite application in an integrated design application system, in accordance with one embodiment.

FIGS. 10A and 10B depict graphical representations of a user interface 1000, 1100 for, respectively, defining volumetric and target metric data of an underlying infrastructure during a process of designing a composite application in an integrated design application system, in accordance with one embodiment.

In the depicted embodiment, user interface 1000 is an exemplary graphical representation of a user interface within integrated design application 100. Exemplary user interface 1000 includes one or more data fields (e.g., title field 1001 and unit abbreviation field 1003) and action buttons (e.g., cancel button 1005 and finish button 1007).

User interface 1000 may, for example, be instantiated by user interface 500 via navigation through toolbar 501. User interface 1000 allows the definition of volumetric data according to user input. As depicted in FIG. 10A, the user is able to define a volumetric by specifying a name (via title field 1001) and the abbreviation of units corresponding to the volumetric (via unit abbreviation field 1003). Definition of a volumetric may include alternate and/or additional fields according to usage and embodiments.

After entering data defining the volumetric, the user is able to submit the input via finish button 1007. After submission, the volumetric is added to a corresponding storage component of the integrated design application system, and the volumetric is stored and persists (e.g., may be used repeatedly) for the current project (e.g., during the design of the present composite application). In other embodiments, a user may elect to store the volumetric permanently (until manually deleted) in a storage component of the integrated design application system, such that the volumetric may be used in subsequent composite application designs. Cancel button 1005 allows the user to exit interface 1000 without submitting data entered in the data fields.

In the depicted embodiment, user interface 1100 is an exemplary graphical representation of a user interface within integrated design application 100. Exemplary user interface 1100 includes one or more data fields (e.g., title field 1101 and unit abbreviation field 1103) and action buttons (e.g., cancel button 1105 and finish button 1107).

User interface 1100 may, for example, be instantiated by user interface 500 via navigation through toolbar 501. User interface 1100 allows the definition of performance metric data according to user input. As depicted in FIG. 10B, the user is able to define a volumetric by specifying a name (via title field 1001) and the abbreviation of units corresponding to the performance metric (via unit abbreviation field 1003). Definition of a performance metric may include alternate and/or additional fields according to usage and embodiments.

After entering data defining the performance metric, the user is able to submit the input via finish button 1007. After submission, the performance metric is added to a corresponding storage component of the integrated design application system, and the performance metric is stored and persists (e.g., may be used repeatedly) for the current project (e.g., during the design of the present composite application). In other embodiments, a user may elect to store the performance metric permanently (until manually deleted) in a storage component of the integrated design application system, such that the performance metric may be used in subsequent composite application designs. Cancel button 1005 allows the user to exit interface 1000 without submitting data entered in the data fields.

Applying Volumetric and Target Metric Data to Object

Figure 11:
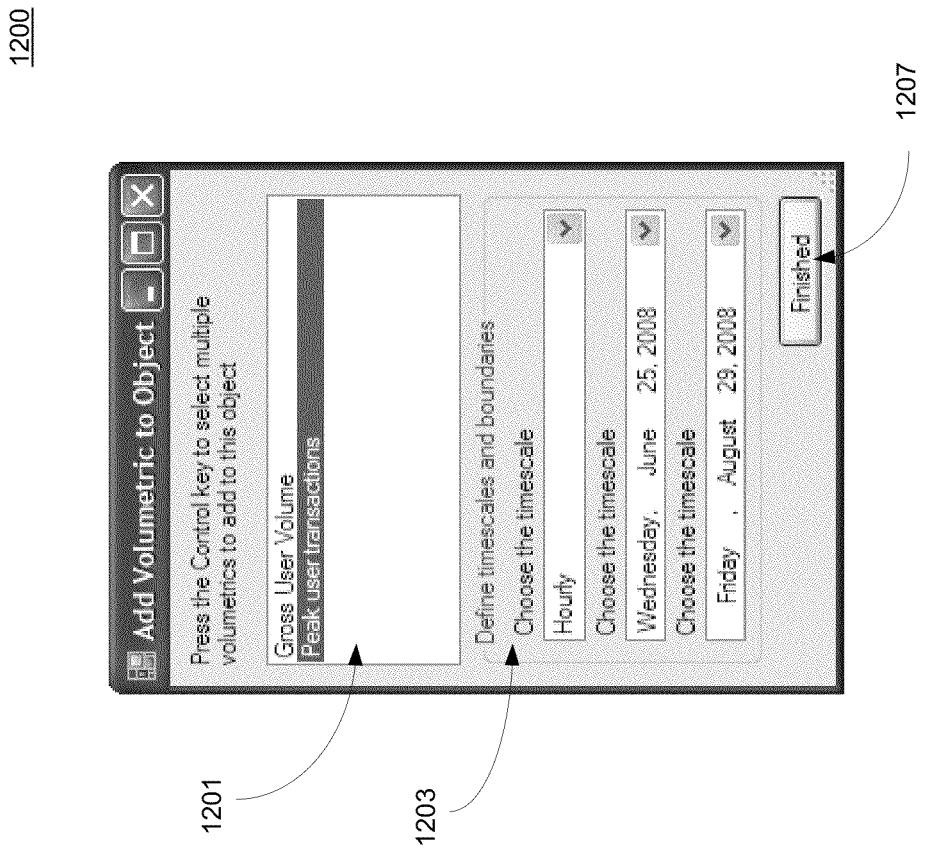
FIG. 11 depicts a graphical representation of a user interface for applying volumetric and target metric data of an underlying infrastructure during a process of designing a composite application in an integrated design application system, in accordance with one embodiment.

FIG. 11 depicts a graphical representation of a user interface 1200 for applying volumetric and target metric data of an underlying infrastructure during a process of designing a composite application in an integrated design application system, in accordance with one embodiment.

In the depicted embodiment, user interface 1200 is an exemplary graphical representation of a user interface within integrated design application 100. Exemplary user interface 1200 includes metric selection field 1201, metric definition field 1203 and action button (e.g., finish button 1007).

User interface 1200 may, for example, be instantiated by user interface 500 via navigation through toolbar 501. User interface 1200 allows the application of volumetric and performance data to a selected object in a composite application design. As depicted in FIG. 11, the user is able to apply a volumetric or performance metric by selecting the name of a pre-defined volumetric or performance metric in metric selection field 1201. In one embodiment, metric selection field 1201 displays all volumetrics and performance metrics defined for the selected object in the composite application design. In other embodiments, metric selection field 1201 may also display volumetrics and performance metrics for all related objects (e.g., objects identified as descendants, ancestors or siblings of the selected object), and/or for an entire group of objects of which the selected object belongs.

After selecting a volumetric or performance metric for the selected object, the data comprising the selected volumetric (e.g., boundaries) may be input by the user via metric definition field 1203. As presented in FIG. 11, a volumetric selected in metric selection field 1201 (e.g., "Peak user transactions") may comprise sub-fields including timescales (the scale of time used in a calculation or measurement, e.g., "Hourly," "Daily," "Weekly," etc. and boundaries (the duration or range of time and dates to measure or calculate)

After data comprising the selected volumetric is entered via metric definition field 1203, a user may apply the volumetric or performance metric to the selected object by selecting finish button 1207. In one embodiment, after a volumetric or performance metric has been applied to an object, a corresponding performance file is edited for the selected object to include the newly applied volumetric or performance metric. The performance file may, for example, be implemented as a spreadsheet comparing the performance data entered for the object with the volumetric load data entered for the object.

In other embodiments, after a volumetric or performance metric has been applied to the selected object, the volumetric or performance metric data is added to every instance of the object in the composite application design. In further embodiments, a user may elect to apply the volumetric or performance data to all objects of same type of the selected object permanently (until manually deleted) in a storage component of the integrated design application system, such that all subsequent instances of the selected object will include the volumetric or performance data.

In an alternate embodiment, the user may select to use baseline (e.g., default) volumetric and metric definitions and quantities from a data repository which correspond to the project type. For example, the user may be able to select from a menu and choose a pre-defined item from which to model the project's definitions based on a pre-existing set of data that is stored and available from the central repository. The application then makes available those typical volumetric types and associated metrics corresponding to each volumetric type, and may automatically pre-fill them in the spreadsheet interface with a standard set of values. In still further embodiments, the user is able to edit the standard set of values so that subsequent selections of the project type will be automatically pre-filled with the updated values.

Figure 12:
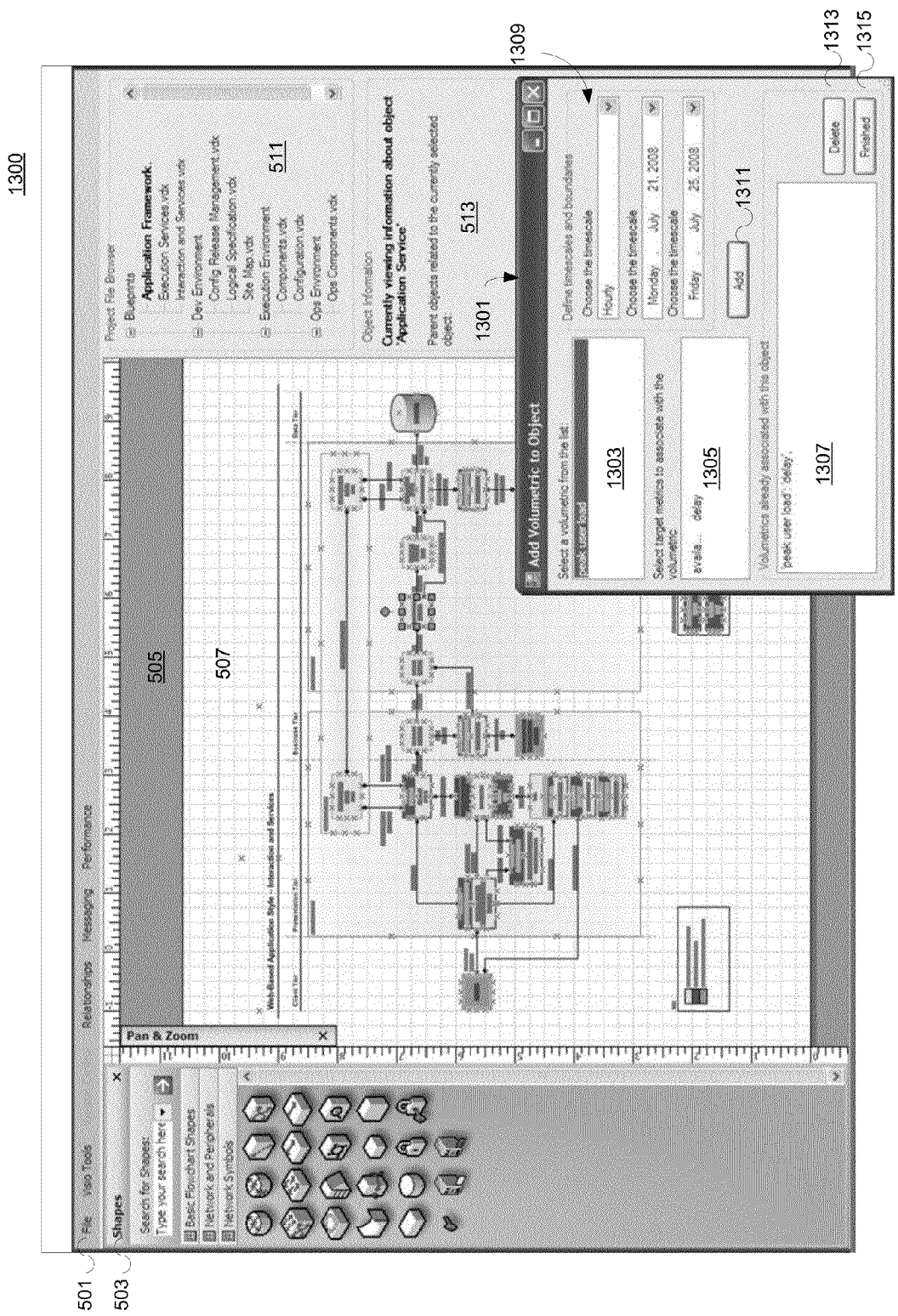
FIG. 12 depicts an alternate graphical representation of a user interface for applying volumetric and target metric data of an underlying infrastructure during a process of designing a composite application in an integrated design application system, in accordance with one embodiment.

FIG. 12 depicts an alternate graphical representation of a user interface 1300 for applying volumetric and target metric data of an underlying infrastructure during a process of designing a composite application in an integrated design application system, in accordance with one embodiment.

In the depicted embodiment, user interface 1300 is an exemplary graphical representation of a user interface within integrated design application 100. Exemplary user interface 1300 may include toolbar 501, panel 503, viewing window 505, exemplary design layout (e.g., layout window 507), File Browser 511, File Information, as previously described. User interface 1300 also includes metric application window 1301.

User interface 1300 includes metric application window 1301 to allow the application of a volumetric and performance metric to an object selected in layout window 507. Metric application window 1301 includes volumetric selection field 1303, performance metric field 1305, associated metric display 1307, metric definition field 1309 and action buttons (e.g., add button 1311, delete button 1313 and finish button 1315).

Volumetric selection field 1303 allows the application of volumetric data to the selected object in layout window 507. The user is able to apply a volumetric or performance metric by selecting the name of a pre-defined volumetric in volumetric selection field 1303. In one embodiment, volumetric selection field 1303 displays all volumetrics defined for the selected object in the composite application design. In other embodiments, volumetric selection field 1303 may also display volumetrics and performance metrics for all related objects (e.g., objects identified as descendants, ancestors or siblings of the selected object), and/or for an entire group of objects of which the selected object belongs.

Performance metric selection field 1305 allows the application of performance metric data to the selected object in layout window 507. The user is able to apply a performance metric or performance metric by selecting the name of a pre-defined performance metric in performance metric selection field 1305. In one embodiment, performance metric selection field 1305 displays all performance metrics defined for the selected object in the composite application design. In other embodiments, performance metric selection field 1305 may also display performance metrics and performance metrics for all related objects (e.g., objects identified as descendants, ancestors or siblings of the selected object), and/or for an entire group of objects of which the selected object belongs.

Associated metric display 1307 displays a list of all metrics currently associated with the object selected in layout window 507. In one embodiment, if a volumetric is currently selected by a user in user interface 1301, only volumetrics associated with the object selected in layout window 507 are displayed in associate metric display 1307. Likewise, if a performance metric is currently selected by a user in user interface 1301, only performance metrics associated with the object selected in layout window 507 are displayed in associate metric display 1307.

Metric definition field 1309 allows a user to add or edit data corresponding to a volumetric or performance metric selected in volumetric selection field 1301 and performance metric selection field 1303. In one embodiment, only one volumetric or performance metric may be selected in either volumetric selection field 1301 and performance metric selection field 1303.

Action buttons (e.g., add button 1311, delete button 1313 and finish button 1315) allow a user to perform an action with the entered data. Add button 1309 allows a user to add (apply) a selected volumetric or performance metric to the selected object. Delete button 1311 allows a user to delete (disassociate) a selected volumetric or performance metric to the selected object. Finish button 1315 submits the data and actions performed in user interface 1301 and exits user interface 1301.

Figure 13:
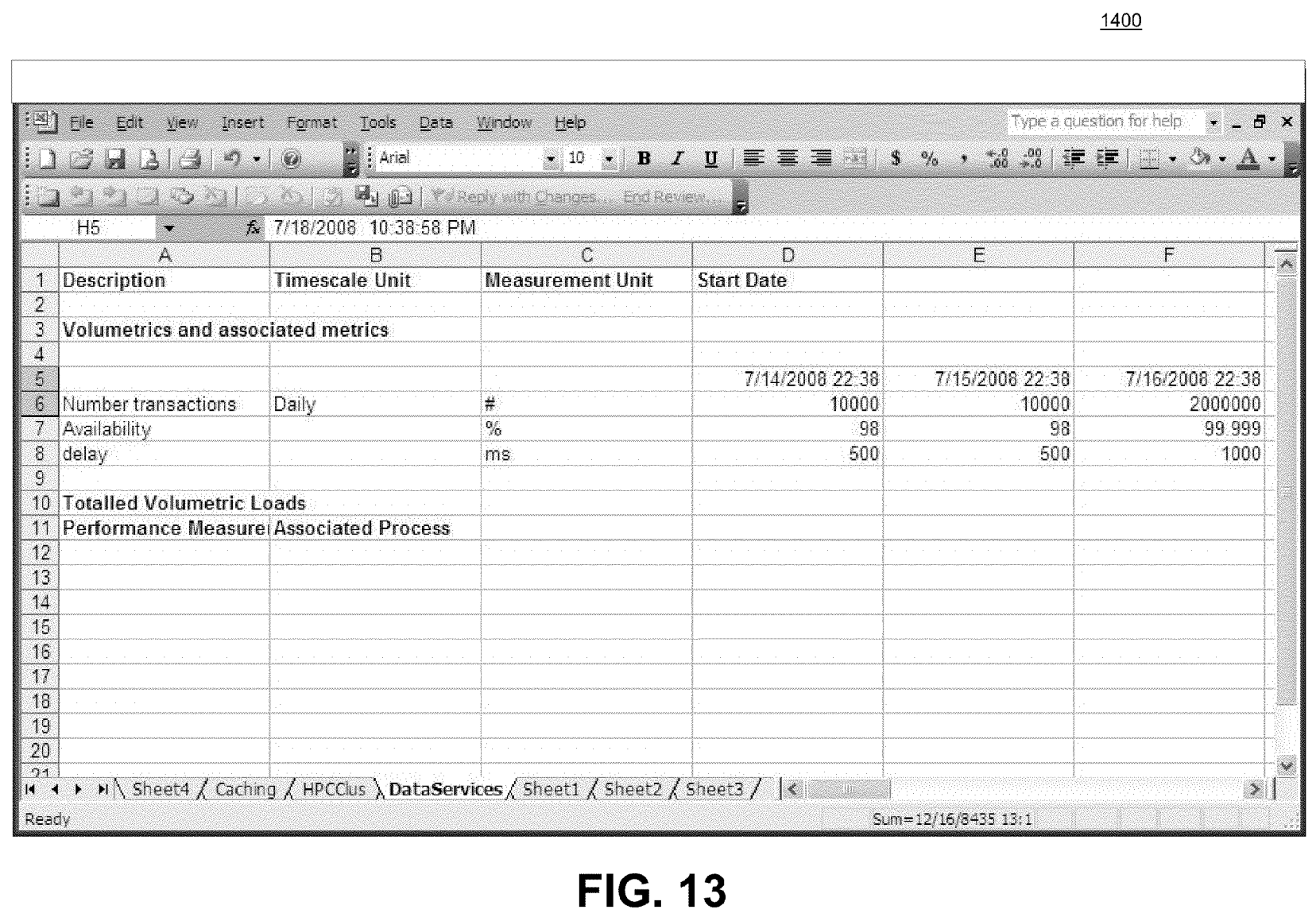

FIG. 13 depicts a graphical representation of an exemplary performance file 1400 corresponding to a selected object in an underlying infrastructure during a process of designing a composite application in an integrated design application system, in accordance with one embodiment.

As depicted in FIG. 13, the performance file is implemented as a spreadsheet comparing the performance data entered for the object with the volumetric load data entered for the object. The performance data entered for an object may be entered via, for example, user interface 1200.

Figure 14:
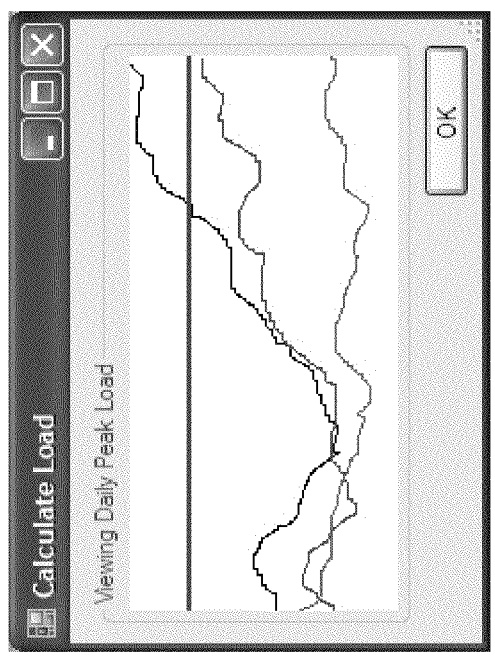
FIG. 14 depicts a graphical representation of an exemplary comparison interface corresponding to volumetric load data and performance metric data of a selected object in an underlying infrastructure during a process of designing a composite application in an integrated design application system, in accordance with one embodiment.

FIG. 14 depicts a graphical representation of an exemplary comparison interface 1500 corresponding to volumetric load data and performance metric data of a selected object in an underlying infrastructure during a process of designing a composite application in an integrated design application system, in accordance with one embodiment.

As depicted in FIG. 14, the data comprising a performance file of the selected object is parsed and analyzed to compare volumetric load data of the selected object to the corresponding performance metric data of the selected object. In one embodiment, the comparison is displayed graphically (e.g., the line graph of FIG. 14). In alternate embodiments, other visualizations may be available.

Figure 15:
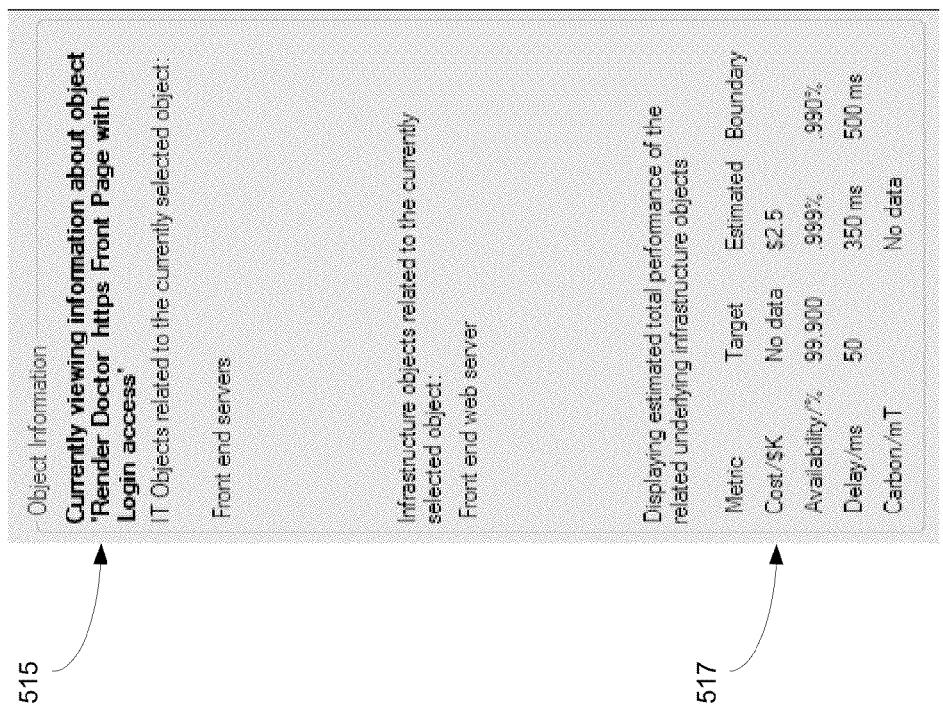
FIG. 15 depicts a graphical representation of an exemplary Metric and Volumetric Display corresponding to a selected object in a layout of an underlying infrastructure during a process of designing a composite application in an integrated design application system, in accordance with one embodiment.

FIG. 15 depicts a graphical representation of an exemplary Object Information Window 1600 corresponding to a selected object in a layout of an underlying infrastructure during a process of designing a composite application in an integrated design application system, in accordance with one embodiment.

As shown in FIG. 15, a typical configuration of Object Information Window 1600 includes Object Information Display 515 and Metric and Volumetric Display 517. Both Object Information Display 515 and Metric and Volumetric Display 517 have been herein described. In one embodiment, Metric and Volumetric Display 517 displays a comparison of the volumetric load data of the selected object to the corresponding performance metric data of the selected object. The data represented in FIG. 15 may, for example, be parsed from the performance file of the selected object according to FIG. 13, and/or the volumetric and metric data input from the user (or obtained from storage) according to FIGS. 11 and 12.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A computer-implemented method comprising:
providing an interface through which a user designs a composite application system by selecting, arranging, and connecting components;
for each component, receiving through the interface, target volumetric values and target performance metric values, wherein the target volumetric values describe input load for the component and wherein the target performance metric values describe performance of the component;
validating performance of the composite application system based on the target volumetric values and the target performance metric values input by the user; and
outputting, through the interface, a result of the validation.

2. The method of claim 1, wherein validating performance of the composite application system based on the target volumetric values and the target performance metric values input by the user, comprises:
- estimating the performance of the composite application system based on the target volumetric values and the target performance metric values input by the user;
- obtaining performance requirements for the composite application system; and
- comparing the estimated performance with the performance requirements.

3. The method of claim 2, wherein estimating the performance of the composite application system based on the target volumetric values and the target performance metric values input by the user, comprises:
- aggregating the target performance metric values input by the user for each component.

4. The method of claim 1, wherein validating performance of the composite application system based on the target volumetric values and the target performance metric values input by the user, comprises:
- calculating a cost of the composite application system based on the target performance metric values input by the user;
- obtaining cost requirements for the composite application system; and
- comparing the calculated cost with the cost requirements.

5. The method of claim 1, wherein validating performance of the composite application system based on the target volumetric values and the target performance metric values input by the user, comprises:
- determining that an estimated performance based on the target volumetric values and the target performance metric values input by the user satisfies performance requirements;
- determining that a calculated cost based on the target performance metric values input by the user satisfies cost requirements; and
- in response to determining that the estimated performance based on the target volumetric values and the target performance metric values input by the user satisfies the performance requirements and determining that the calculated cost based on the target performance metric values input by the user satisfies the cost requirements, validating that the composite application system is feasible.

6. The method of claim 1, wherein the components represent functions, the method comprising:
- for each component, receiving through the interface, a selection of a software application to perform the function; and
- for each component, receiving through the interface, a selection of hardware to execute the selected software application,
- wherein validating the performance of the composite application system based on the target volumetric values and the target performance metric values input by the user is further based on the selection of the software application for the components and the selections of the hardware to execute the selected software application.

7. The method of claim 1, wherein the volumetric values represent values for number of user sessions, number of messages, frequency of messages, and duration of access.

8. The method of claim 1, wherein the performance metric values represent values for cost and availability.

9. A system comprising:
- one or more computers; and
- one or more storage devices storing instructions that are operable, when executed by the one or more computers, to cause the one or more computers to perform operations comprising:
  - providing an interface through which a user designs a composite application system by selecting, arranging, and connecting components;
  - for each component, receiving through the interface, target volumetric values and target performance metric values, wherein the target volumetric values describe input load for the component and wherein the target performance metric values describe performance of the component;
  - validating performance of the composite application system based on the target volumetric values and the target performance metric values input by the user; and
  - outputting, through the interface, a result of the validation.

10. The system of claim 9, wherein validating performance of the composite application system based on the target volumetric values and the target performance metric values input by the user, comprises:
- estimating the performance of the composite application system based on the target volumetric values and the target performance metric values input by the user;
- obtaining performance requirements for the composite application system; and
- comparing the estimated performance with the performance requirements.

11. The system of claim 10, wherein estimating the performance of the composite application system based on the target volumetric values and the target performance metric values input by the user, comprises:
- aggregating the target performance metric values input by the user for each component.

12. The system of claim 9, wherein validating performance of the composite application system based on the target volumetric values and the target performance metric values input by the user, comprises:
- calculating a cost of the composite application system based on the target performance metric values input by the user;
- obtaining cost requirements for the composite application system; and
- comparing the calculated cost with the cost requirements.

13. The system of claim 9, wherein validating performance of the composite application system based on the target volumetric values and the target performance metric values input by the user, comprises:
- determining that an estimated performance based on the target volumetric values and the target performance metric values input by the user satisfies performance requirements;
- determining that a calculated cost based on the target performance metric values input by the user satisfies cost requirements; and
- in response to determining that the estimated performance based on the target volumetric values and the target performance metric values input by the user satisfies the performance requirements and determining that the calculated cost based on the target performance metric values input by the user satisfies the cost requirements, validating that the composite application system is feasible.

14. The system of claim 9, wherein the components represent functions, the operations comprising:
- for each component, receiving through the interface, a selection of a software application to perform the function; and
- for each component, receiving through the interface, a selection of hardware to execute the selected software application,
- wherein validating the performance of the composite application system based on the target volumetric values and the target performance metric values input by the user is further based on the selection of the software application for the components and the selections of the hardware to execute the selected software application.

15. The system of claim 9, wherein the volumetric values represent values for number of user sessions, number of messages, frequency of messages, and duration of access.

16. The system of claim 9, wherein the performance metric values represent values for cost and availability.

17. A non-transitory computer-readable medium storing software comprising instructions executable by one or more computers which, upon such execution, cause the one or more computers to perform operations comprising:
- providing an interface through which a user designs a composite application system by selecting, arranging, and connecting components;
- for each component, receiving through the interface, target volumetric values and target performance metric values, wherein the target volumetric values describe input load for the component and wherein the target performance metric values describe performance of the component;
- validating performance of the composite application system based on the target volumetric values and the target performance metric values input by the user; and
- outputting, through the interface, a result of the validation.

18. The medium of claim 17, wherein validating performance of the composite application system based on the target volumetric values and the target performance metric values input by the user, comprises:
- estimating the performance of the composite application system based on the target volumetric values and the target performance metric values input by the user;
- obtaining performance requirements for the composite application system; and
- comparing the estimated performance with the performance requirements.

19. The medium of claim 18, wherein estimating the performance of the composite application system based on the target volumetric values and the target performance metric values input by the user, comprises:
- aggregating the target performance metric values input by the user for each component.

20. The medium of claim 17, wherein validating performance of the composite application system based on the target volumetric values and the target performance metric values input by the user, comprises:
- calculating a cost of the composite application system based on the target performance metric values input by the user;
- obtaining cost requirements for the composite application system; and
- comparing the calculated cost with the cost requirements.

* * * * *